United States Patent [19]
Hasegawa

[11] Patent Number: 5,848,061
[45] Date of Patent: *Dec. 8, 1998

[54] ECHO CANCELING APPARATUS HAVING A PLURALITY OF FRAME ALIGNERS ASSIGNED TO RESPECTIVE VOICE CHANNELS AND METHOD OF FRAME ALIGNING

[75] Inventor: Atsushi Hasegawa, Tokyo, Japan

[73] Assignee: NEC Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 816,529

[22] Filed: Mar. 13, 1997

[30] Foreign Application Priority Data

Mar. 13, 1996 [JP] Japan .................................. 8-055249

[51] Int. Cl.$^6$ ...................................................... H04B 3/20
[52] U.S. Cl. .......................... 370/286; 379/408; 379/409; 379/410
[58] Field of Search ..................................... 370/286, 287, 370/288, 289, 503, 509, 510, 516; 379/410, 408, 409; 333/18, 28 R

[56] References Cited

U.S. PATENT DOCUMENTS

| Re. 31,253 | 5/1983 | Weinstein | 370/286 |
| 4,777,633 | 10/1988 | Fletcher et al. | 370/345 |
| 4,845,746 | 7/1989 | Li | 370/286 |
| 5,327,489 | 7/1994 | Anderson et al. | 379/410 |
| 5,664,011 | 9/1997 | Crochiere et al. | 379/410 |

Primary Examiner—Douglas W. Olms
Assistant Examiner—Phirin Sam
Attorney, Agent, or Firm—Sughrue, Mion, Zinn, Macpeak & Seas, PLLC

[57] ABSTRACT

In order to effectively reduce an undesirable occurrence of excessive frame slip in a digital telecommunications system, a plurality of frame aligners are respectively provided such as to be assigned to a plurality of channel echo cancelers.

6 Claims, 7 Drawing Sheets

( USUALLY n=5 )

ECHO CANCELING APPARATUS HAVING A PLURALITY OF FRAME ALIGNERS ASSIGNED TO RESPECTIVE VOICE CHANNELS AND METHOD OF FRAME ALIGNING

BACKGOUND OF THE INVENTION

1. Field of the invention

The present invention relates generally to an echo canceling apparatus for use in a digital telecommunications system wherein a plurality of channel voice data are transmitted using a multiframe signal, and more specifically to such an echo canceling apparatus wherein a plurality of frame aligners are assigned to respective voice channels in order to implement frame alignment prior to echo cancellation. Still more specifically, the present invention relates to a method of implementing frame alignment in each of the plurality of frame aligners.

2. Description of the Related Art

Long distance telephone communications systems have been constantly plagued by a so called "echo" phenomenon. A known approach to solving this problem is the use of an echo canceler which by means of an adaptive digital filter makes an estimate of the transfer function of the echo path and uses that information to subtract the echo in the return path. As is well known in the art, echoes occur as a result of transmitted signals being coupled into a return path and fed back to the respective sources. The most common cause of the coupling is an impedance mismatch at a four-wire to two-wire hybrid.

Before turning to the present invention it is deemed advantageous to describe, with reference to FIGS. 1–5, a conventional echo canceler for use in a digital telephone communications system.

Figure 1:
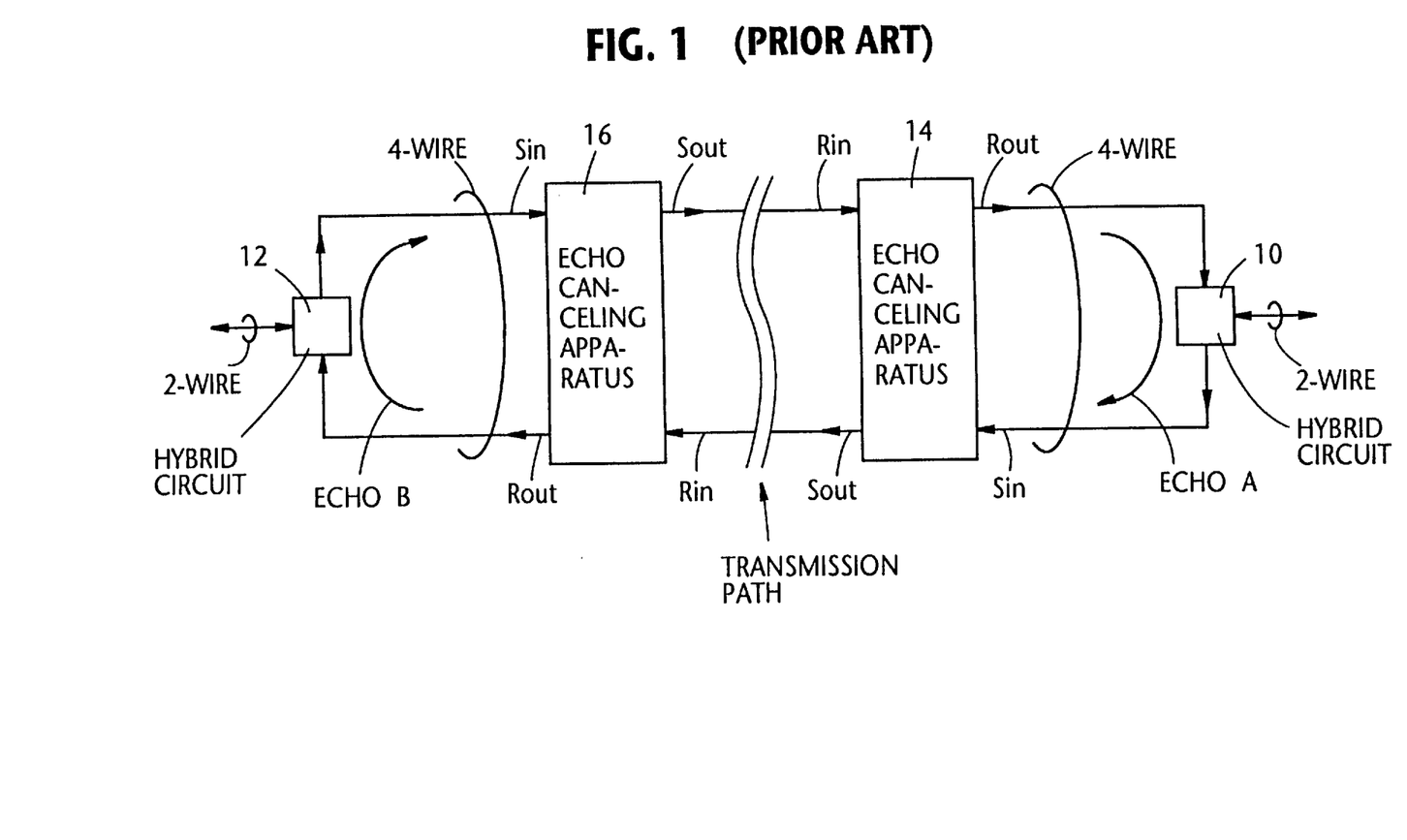
FIG. 1 is a block diagram schematically showing echo canceling apparatuses provided in a digital telecommunications system to which the present invention is applicable, having been referred to in the opening paragraphs.

FIG. 1 is a simplified schematic which illustrates echoes A and B respectively induced by impedance mismatch at four-wire to two-wire hybrid circuits (or hybrid transformers) 10 and 12. The echoes A and B are respectively canceled at echo canceling apparatuses 14 and 16 to which the present invention is applicable. Since the arrangement of FIG. 1 is well known in the art, the further descriptions thereof are deemed redundant and accordingly will be omitted for brevity.

Figure 2:
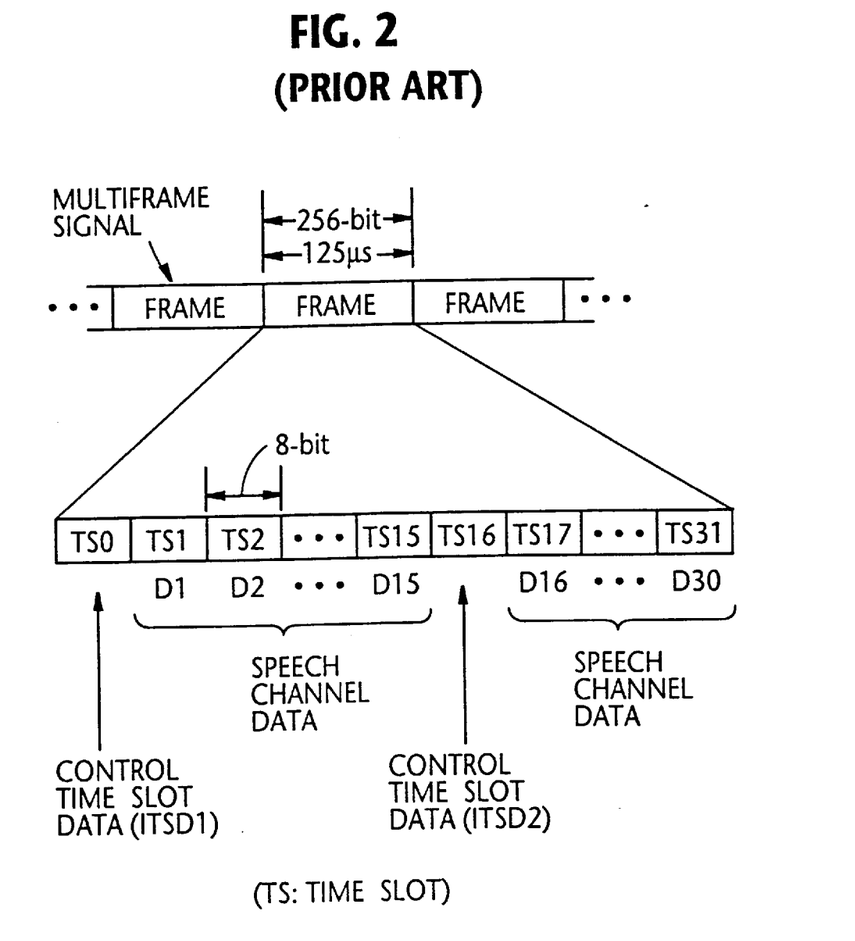
FIG. 2 is a diagram showing a multiframe structure and time slots included in each frame, having referred to in the opening paragraphs.

FIG. 2 schematically shows a structure of a multiframe signal which can be used with the present invention and a plurality of consecutive time slots of one frame. As shown, each frame is 256 bits long and has a time interval of 125 $\mu$s. Further, each frame consists of thirty-two (32) 8-bit long time slots TS0–TS31 and thus, the bit rate in this particular case is 2.048 Mbps (mega-bit per second). The time slots TS0 and TS16 are control time slots, while the remaining time slots TS1–TS15 and TS17–TS31 are respectively assigned to voice channels. It is to be noted however that the present invention is In no way limited to the frame format, the number of time slots, etc. shown in FIG. 2.

Figure 3:
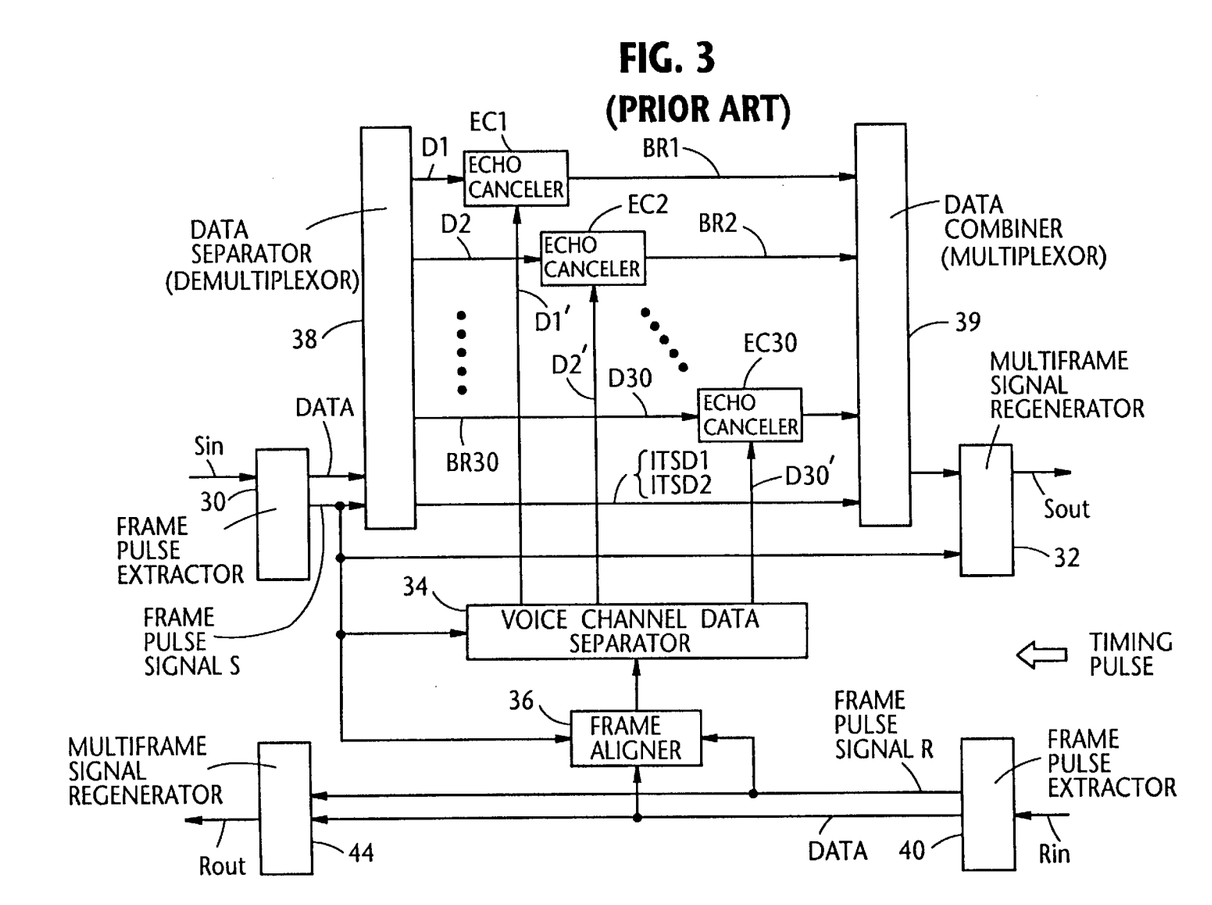
FIG. 3 is a block diagram showing the details of a conventional echo canceling apparatus, having referred to in the opening paragraphs.
Figure 4:
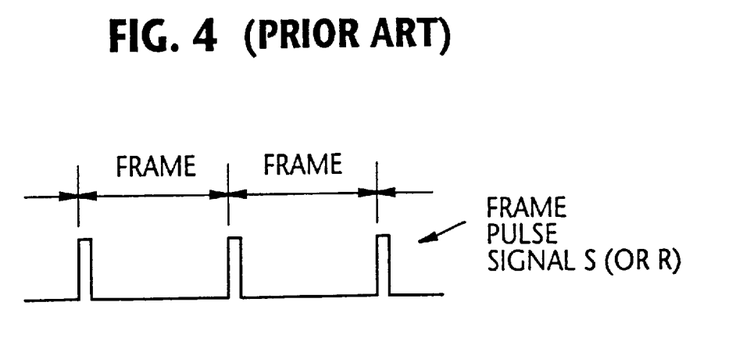
FIG. 4 is a sketch schematically showing a frame pulse signal generated in the arrangement of FIG. 3.

FIG. 3 is a block diagram schematically showing the conventional echo canceling apparatus.

As shown in FIG. 3, an outgoing multiframe signal Sin is applied to a frame signal extractor (or framer) 30 which issues a frame pulse signal S (see FIG. 4) using a frame-alignment signal included in the time slot TS0 (FIG. 2) and applies the frame pulse signal S to a data separator (demultiplexter) 38, a multiframe signal regenerator 32, a voice channel data separator 34, and a frame aligner 36. The frame pulse signal S is able to specify the beginning time point of each frame. It is to be noted that all the blocks of FIG. 3 operate under control of timing pulses respectively applied thereto.

The frame pulse extractor 30 permits the data, involved in the time slots TS0–TS31, to pass therethrough and applies them to a data separator (demultiplexor) 38 at which the voice channel data assigned to the TS1–TS15 and TS17–TS30 are separated (viz., demultiplexed) and respectively applied to corresponding echo cancelers EC1–EC30 deposited in data channel branches BR1–BR30. On the other hand, the data separator 38 separates the control data in the time slots TS0 and TS16, and directly applies them to a data combiner (i.e., multiplexor) 39.

Another frame signal extractor 40 is supplied with an incoming multiframe signal Rin from a distant-end exchange and extracts a frame pulse signal R in exactly the same manner as the above mentioned frame signal extractor 30. The frame pulse signal R is applied to the frame aligner 36 and a multiframe signal regenerator 44. As in the above, the frame pulse signal R is able to specify the time point at which each frame begins. The data included in the time slots TS0-TS31 are fed to the frame aligner 36 and the frame signal regeneator 44 which in turn regenerates the signal Rin using the frame pulse signal R, and issues the recombined signal as the signal Rout.

The frame aligner 36 detects a phase difference between the frame pulse signals S and R, and controls a phase of the incoming voice data, included in the multiframe signal Rin, using the detected phase difference. Therefore, the incoming voice channel data are synchronized with the outgoing voice data. The incoming voice data thus synchronized are fed to the voice channel data separator 34 wherein the voice data are separated into channel data D1'–D30' and then applied to respective echo cancelers EC1–EC30.

Figure 5:
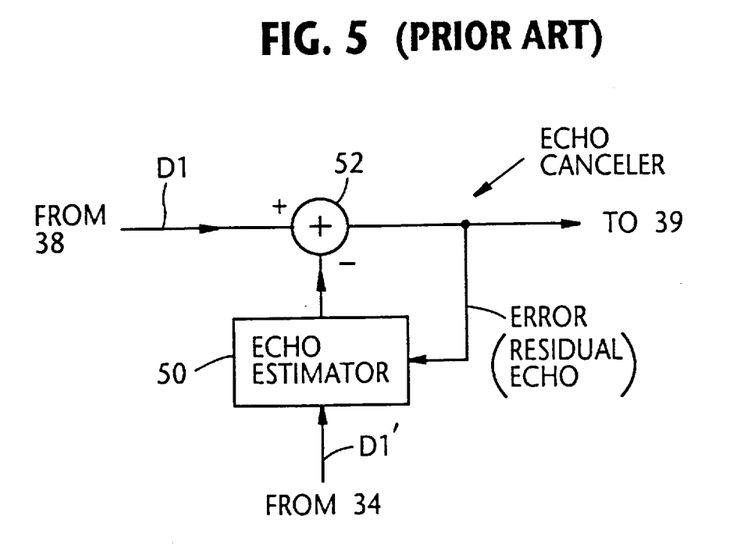
FIG. 5 is a block diagram showing an echo canceler used in the arrangement of FIG. 3.

FIG. 5 is a block diagram schematically showing the echo canceler EC1. It is to be noted however that each of the other echo cancelers EC2–EC30 is identical to the canceler EC1. The arrangement of FIG. 5 is well known in the art and thus, merely a brief description is given. An echo estimator 50 takes the form of adaptive digital filter and generates pseudo-echo components using the incoming channel data D1'. The pseudo-components are subtracted from the outgoing voice channel data D1 at a subtracter 52, and applied to the data combiner 39. Further, the echo estimator 50 receives the output of the subtracter 52 (viz., error or residual echo) and operates such as to eliminate same.

Returning to the frame aligner 36 of FIG. 3. If the above mentioned phase difference between the frame pulse signals S and R exceeds a predetermined range (usually ±2 frames from a synchronized situation), the echo cancellation is not successfully implemented at each of the echo cancelers EC1–EC30. The aforesaid frame slip in excess of the predetermined range, may occur once in about 3 hours. It goes without saying that the frequency of occurrences of such excessive frame slip may depend largely on an actual transmission condition.

Therefore, it is highly desirable to reduce the frequency of occurrence of undesirable slip in order to prevent speech signal from being degraded.

SUMMARY OF THE INVENTION

It is therefore an object of the present invention to provide an echo canceling apparatus which is provided with a plurality of frame aligners respectively dedicated to voice channels in order to effectively reduce the frequency of occurrences of excessive frame slip.

Another object of the present invention is to provide a method of effectively reducing the frequency of occurrences of excessive frame slip by providing a plurality of frame aligners respectively allocated to voice channels.

One aspect of the present invention resides in an apparatus for canceling echoes in a digital telecommunications system wherein a plurality of voice channel data are transmitted in series using a multiframe signal, comprising: a first signal processing means for issuing a first frame pulse signal using an outgoing multiframe signal applied thereto and for demultiplexing consecutive outgoing voice channel data and control data wherein both data are included in the outgoing multiframe signal, the first signal processing means outputting a plurality of separated voice channel data over a plurality of parallel branches, respectively; a plurality of echo cancelers respectively disposed in the plurality of parallel branches; a second signal processing means for issuing a second frame pulse signal using an incoming multiframe signal applied thereto and allowing consecutive incoming voice channel data and control data, included in the incoming multiframe signal, to pass therethrough; a data separator for separating the incoming voice channel data in parallel; a controller for generating a plurality of voice channel busy/idle signals using the control signal outputted from the first signal processing means; and a plurality of frame aligners for receiving the first and second frame pulse signals, the plurality of frame aligners further respectively receiving the plurality of incoming voice channel data, and the plurality of voice channel busy/idle signals, the plurality of frame aligners respectively applying the plurality of incoming voice channel data to the plurality of echo cancelers after implementing frame alignment on the outgoing and incoming multiframes signals using the first and second frame pulse signals.

BRIEF DESCRIPTION OF THE DRAWINGS

The feature and advantages of the present invention will become more clearly appreciated from the following description taken in conduction with the accompanying drawings in which like members or elements are denoted by like reference numerals and in which.

DETAILED DESCRIPTION OF THE PREFERRED EMBODIMENTS

A preferred embodiment of the present invention will be described with reference to the accompanying drawings.

Figure 6:
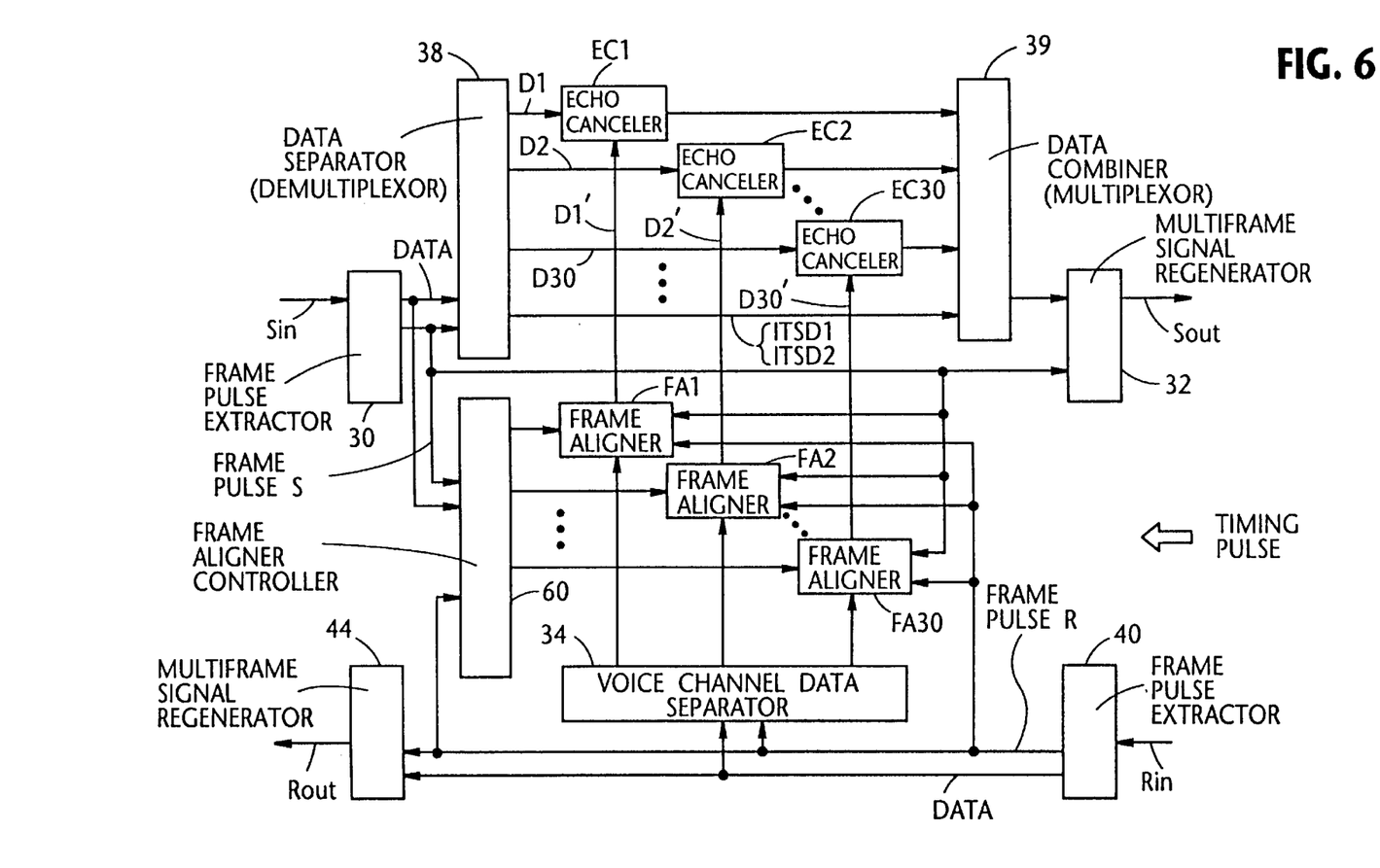
FIG. 6 is a block diagram showing an echo canceling apparatus according to an embodiment of the present invention.

FIG. 6 is a block diagram showing the echo canceling apparatus according to the embodiment of the present invention. The arrangement of FIG. 6 differs from that of FIG. 3 in that the former arrangement comprises a plurality of frame aligners FA1–FA30 in place of the frame aligner 36, and a frame aligner controller 60. The frame aligners FA1–FA30 are respectively coupled such as to apply the data D1'–D30' to the associated echo cancelers EC1–EC30. Other than this, the arrangement of FIG. 6 is substantially identical to that of FIG. 3 and thus, the descriptions of the blocks already referred to in connection with FIG. 3 will be omitted for the sake of simplifying the instant disclosure except for becoming necessary in context.

The frame aligner controller 60 receives the frame pulse signal S, from the frame pulse extractor 30, which defines the time point at which a new frame begins. The controller 60 further receives the control data included in the time slots TS16 from the frame pulse extractor 30. The controller 60 checks to determine if the time slot TS16 carries a busy/idle signal which indicates that each of the voice channels, respectively assigned to the time slots TS1–TS15 and TS17–TS31, is busy or idle. It is to be noted that the voice channel busy/idle signal is one of the control signals which are transmitted over the time slot TS16. That is to say, the voice channel busy/idle signal is intermittently inserted into the time slot 16 at a transmitter (not shown). When the frame aligner controller 60 detects that a given voice channel is busy, the controller 60 applies a logic level 0 to the corresponding frame aligner. On the contrary, when the frame aligner controller 60 detects that a given voice channel is idle, the controller 60 applies a logic level 1 to the corresponding frame aligner. Still further, the frame aligner controller 60 receives the frame pulse signal R from the frame pulse extractor 40.

In the above, the frame aligner controller 60 was described such as to detect the busy/idle signal contained in the time slot TS16 of the outgoing signal. However, as an alternative, the busy/idle signal can be obtained from the incoming signal Rin.

Figure 7:
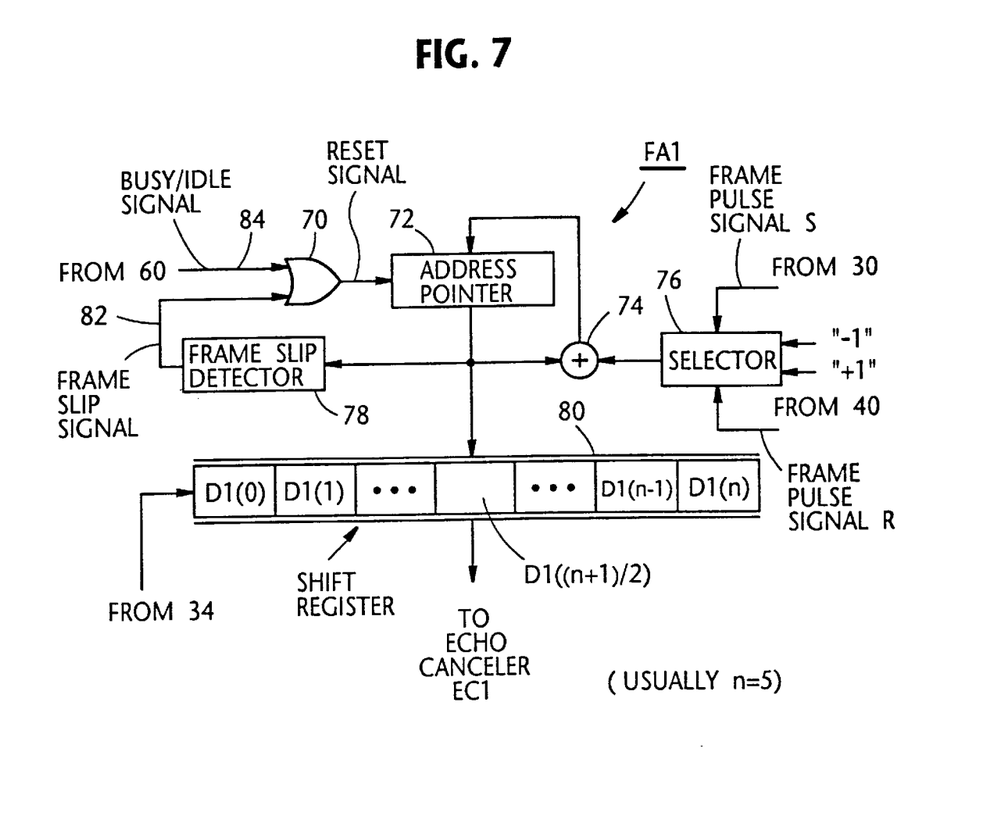
FIG. 7 is a block diagram showing a frame aligner used in the arrangement of FIG. 6.

FIG. 7 illustrates the details of the frame aligner FA1 which comprises an OR gate, 70, an address pointer 72, an adder 74, a selector 76, a frame slip detector 78, and a shift register 80, all of which are interconnected as illustrated, Each of the remaining frame aligners FA2–FA30 is configured in exactly the manner as the frame aligner FA1.

The shift register 80 is shown such as to successively store (n+1) time slot voice data D1(O)–D1(n). However, it is in practice that the shift register 80 is arranged so as to store six time slot data (viz., n=5) and accordingly, the following descriptions are made on the assumption of n=5 for the sake of simplifying the disclosure.

It is assumed that the address pointer 72 has initially been set to a predetermined value 3 (=(5+1)/2 (viz., n=5)) under control of a suitable CPU (central processing unit) although not shown in FIG. 7. The shift register 80 successively receives the voice data from the voice channel data separator 34 and stores consecutive six time slot data therein. When the address pointer 72 retains the above mentioned predetermined initial value 3, the time slot data located at the center portion (viz., D1(3)) of the shift register 80 is outputted to the echo canceler EC1 as the data D1'. The selector 76 responds to the frame pulse signal S and selects a negative integer "−1" and applies it to the adder 74. On the other hand, the selector 76 responds to the frame pulse signal R and selects a positive integer "+1" and applies it to the adder 74. The adder 74 sums up the outputs of the address pointer 72 and the selector 76. The output of the adder 74 is applied to the address pointer 72 and therefore, the content of the pointer 72 is subject to change in response to each application of the frame pulses S and R.

The frame slip detector 78 receives the output of the address pointer 72 and checks to determine whether or not the output of the pointer 72 is in a range between −2 and +2 in this particular case with respect to the initial value 3. In the event that the output of the address pointer 72 (viz., read-out address) falls out of the aforesaid range, the frame slip detector 78 issues a frame slip signal 82 which assumes a logic level 1 and which is applied, via the OR gate 70, to the address pointer 72 as a reset signal. Therefore, the address pointer 72 is reset to the initial value 3.

On the other hand, when the busy/idle signal 84 assumes a logic level 1 indicating that the voice channel 1 becomes idle, the address pointer 72 is also reset to the initial value 3.

Figure 8:
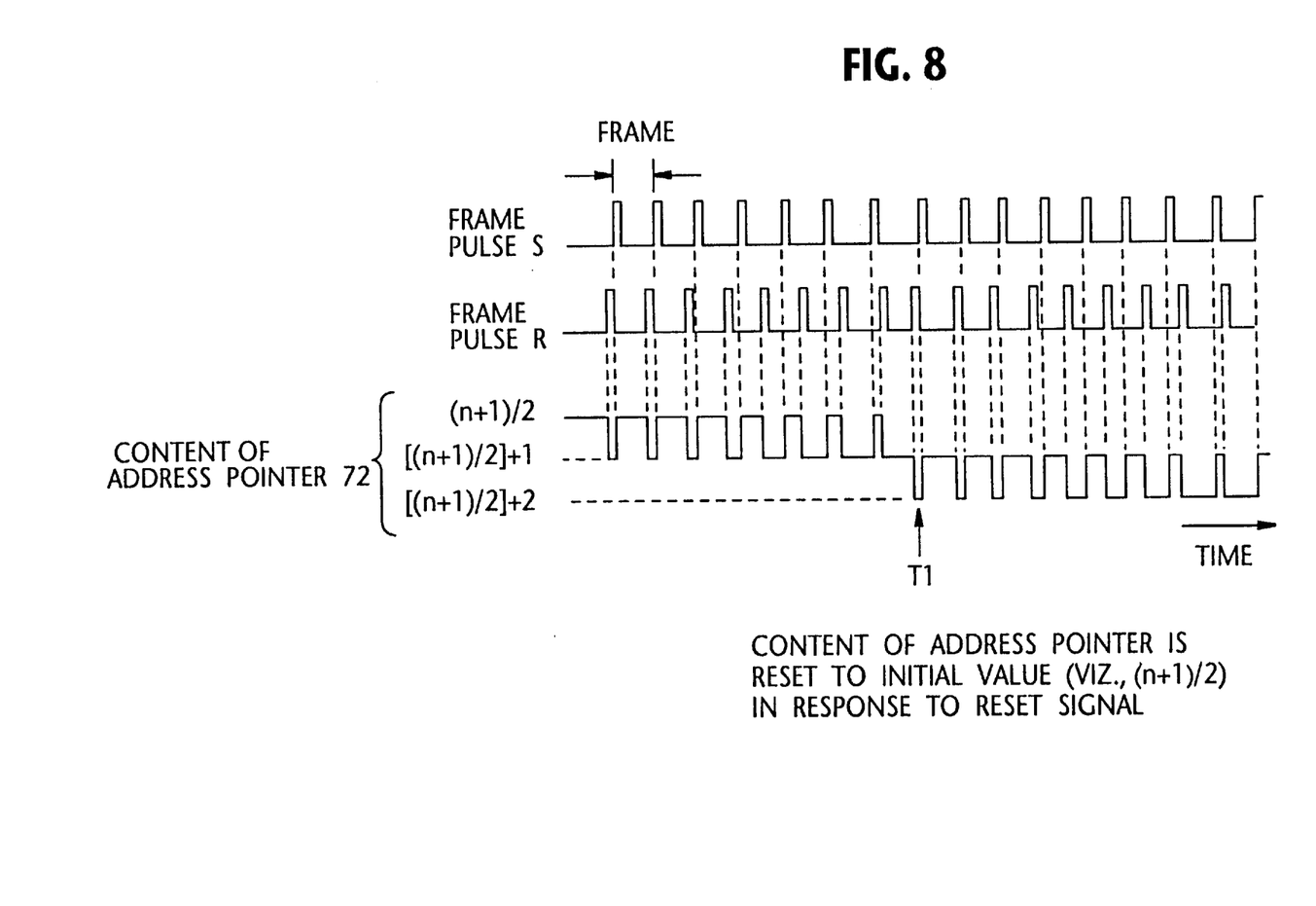
FIG. 8 is timing charts for describing the operation of the frame aligner of FIG. 7.

FIG. 8 is a sketch illustrating a manner wherein the content (viz., read-out address) of the pointer 72 varies in response to the frame pulses S and R. In the particular case shown In FIG. 8, the frame pulse R continues to advance with time relative to the frame pulse S. That is, this case may imply that the incoming multiframe signal Rin tends to become faster with time relative to the outgoing multiframe signal Sin at the echo canceling apparatus of FIG. 6. As shown, the content of the pointer 72 changes between 3 (viz., initial value) and 4 up to a time point T1 and then changes between 4 and 5 after T1.

For example, if it is assumed that the frequency of occurrences of the above mentioned excessive frame slip is once in about 3 hours, the actual excessive frame slip happens only in the case where the voice channel continues to be busy. In other words, the aforesaid excessive frame slip never occur if the voice channel becomes idle within about 3 hours.

It should be understood that the foregoing description is only illustrative of the present invention and that various alternatives and modification can be devised by those skilled in the art without departing from its scope.

What is claimed is:

1. An apparatus for canceling echoes in a digital telecommunications system wherein a plurality of voice channel data are transmitted in series using a multiframe signal, comprising:

a first signal processing means for issuing a first frame pulse signal using an outgoing multiframe signal applied thereto and for demultiplexing consecutive outgoing voice channel data and control data wherein both data are included in said outgoing multiframe signal, said first signal processing means outputting a plurality of separated voice channel data over a plurality of parallel branches, respectively;

a plurality of echo cancelers respectively disposed in said plurality of parallel branches;

a second signal processing means for issuing a second frame pulse signal using an incoming multiframe signal applied thereto and allowing consecutive incoming voice channel data and control data, included in said incoming multiframe signal, to pass therethrough;

a data separator for separating said incoming voice channel data in parallel;

a controller for generating a plurality of voice channel busy/idle signals using the control data outputted from said first signal processing means; and a plurality of frame aligners for receiving said first and second frame pulse signals, said plurality of frame aligners further respectively receiving said plurality of incoming voice channel data, and said plurality of voice channel busy/idle signals, said plurality of frame aligners respectively applying said plurality of incoming voice channel data to said plurality of echo cancelers after implementing frame alignment on said outgoing and incoming multiframes signals using said first and second frame pulse signals.

2. An apparatus as claimed in claim 1, wherein:

said first signal processing means for receiving said outgoing multiframe signal and issuing said first frame pulse signal using said control data included in said outgoing multiframe signal, further separates said outgoing multiframe signal to said plurality of outgoing voice channel data in parallel; and said apparatus further comprises:

a second signal processing means for receiving said incoming voice channel data and issuing said second frame pulse signal.

3. An apparatus for canceling echoes in a digital telecommunications system, said apparatus receiving an outgoing and incoming multiframe signal each of which includes a plurality of voice channel data and a control data, said apparatus comprising:

a plurality of echo cancelers respectively disposed in parallel and assigned to a plurality of outgoing voice channel data which have been separated in parallel from said outgoing multiframe signal;

a data separator for separating in parallel said incoming multiframe signal into a plurality of incoming voice channel data;

a controller for generating a plurality of voice channel busy/idle signals using the control data included in either said outgoing multiframe signal or said incoming multiframe signal; and a plurality of frame aligners for receiving first and second frame pulse signals which are respectively derived from said outgoing and incoming multiframe signals, said plurality of frame aligners further receiving said plurality of respective incoming voice channel data and said plurality of respective voice channel busy/idle signals, said plurality of frame aligners applying said plurality of respective incoming voice channel data to said plurality of respective echo cancelers after implementing frame alignment of said outgoing and incoming multiframe signals using said first and second frame pulse signals.

4. An apparatus as claimed in claim 3, wherein each of said plurality of frame aligners comprises:

a shift register for temporarily storing a predetermined number of incoming voice channel data successively applied thereto;

an address pointer for specifying one of the incoming voice channel data stored in said shift register, said address pointer changing the value thereof in response to said first and second frame pulse signals applied to the frame aligner; and a frame slip detector for detecting a predetermined frame slip, between said outgoing and incoming multiframe signals, using the value of said address pointer, wherein said address pointer is reset in response to said predetermined frame slip detected at said frame slip detector or a channel idle situation indicated by a corresponding voice channel busy/idle signal.

5. An apparatus as claimed in claim 4, further comprising:

an address pointer controller for reducing and increasing the value of said address pointer by one frame in response to said first and second frame pulse signals, respectively.

6. A method of canceling echoes, in a digital telecommunications system, at an apparatus to which an outgoing and incoming multiframe signal is applied, each of said outgoing and incoming multiframe signals include a plurality of voice channel data and a control data, said method comprising the steps of:

(a) disposing respectively a plurality of echo cancelers in parallel and assigning said plurality of echo cancelers to a plurality of outgoing voice channel data which have been separated in parallel from said outgoing multiframe signal;

(b) separating in parallel said incoming multiframe signal into a plurality of incoming voice channel data;

(c) generating a plurality of voice channel busy/idle signals using the control data included in either said outgoing multiframe signal or said incoming multiframe signal;

(d) receiving, at a plurality of frame aligners, first and second frame pulse signals which are respectively derived from said outgoing and incoming multiframe signals; and (e) receiving, at said plurality of frame aligners, said plurality of respective incoming voice channel data and said plurality of respective voice channel busy/idle signals, and applying said plurality of respective incoming voice channel data to said plurality of respective echo cancelers after implementing frame alignment on said outgoing and incoming multiframe signals using said first and second frame pulse signals.

* * * * *